United States Patent [19]
Hertl

[11] 3,924,032
[45] Dec. 2, 1975

[54] SURFACE MODIFICATION OF SILICA PARTICLES
[75] Inventor: William Hertl, Corning, N.Y.
[73] Assignee: Corning Glass Works, Corning, N.Y.
[22] Filed: Jan. 28, 1974
[21] Appl. No.: 437,007

[52] U.S. Cl. .............. 427/220; 427/255; 427/301
[51] Int. Cl.² ........................................... B05D 7/00
[58] Field of Search......... 117/100 S, 62.1, 126 GQ, 117/124 D, 54, 106 R; 427/220, 255, 301

[56] References Cited
UNITED STATES PATENTS

| | | | |
|---|---|---|---|
| 2,657,149 | 10/1953 | Iler | 117/100 S |
| 2,736,668 | 2/1956 | Broge | 117/100 S |
| 2,736,669 | 2/1956 | Goebel | 117/100 S |
| 2,739,074 | 3/1956 | Iler | 117/100 S |
| 2,739,075 | 3/1956 | Iler | 117/100 S |
| 2,739,076 | 3/1956 | Iler | 117/100 S |
| 2,739,078 | 3/1956 | Broge | 117/100 S |
| 2,898,496 | 8/1959 | Clark | 117/54 |
| 2,973,282 | 2/1961 | Gross | 117/106 R |
| 3,093,508 | 6/1963 | Wartenberg | 117/106 R |
| 3,177,083 | 4/1965 | de Vries | 117/100 S |

FOREIGN PATENTS OR APPLICATIONS
1,070,795  6/1958  Germany

OTHER PUBLICATIONS
Chem. Abstracts, Vol. 55, Article 27832(a), Johannes Löffler.
"Methods of Cleaning Glass by Vapour Degreasing and Ultrasonically Agitated Solvents," British Journal of App. Sci., July 1959, Vol. 10, pp. 332–336.
"Vinyl Silane Size for Glass Fabric," Modern Plastics, No. 11, July 1952, pp. 124 and 188.

Primary Examiner—William D. Martin
Assistant Examiner—Dennis C. Konopacki
Attorney, Agent, or Firm—James A. Giblin; Clinton S. Janes, Jr.; Clarence R. Patty, Jr.

[57] ABSTRACT
The surface of silica materials can be usefully modified by reacting the particles at an elevated temperature with carbon tetrachloride to form a very reactive chlorinated surface which can then be reacted with hydroxyl-containing organic compounds to form a stable organic surface on the particles.

7 Claims, No Drawings

SURFACE MODIFICATION OF SILICA PARTICLES

BACKGROUND OF THE INVENTION

1. Field

This invention is concerned generally with the surface modification of silica materials and specifically with the formation of a stable organic surface on high surface area siliceous materials.

2. Prior Art

It is known that the surface of silica materials can be modified in various ways to optimize the surface for a given application of the silica. For example, it is known that the surface of an essentially siliceous material such as porous glass can be "deactivated" by exposing the porous glass at elevated temperatures to a stream of ammonia or steam. Such a surface deactivation enhances the utility of porous glass particles which are used in some chromatographic applications. See, for example, U.S. patent application Ser. No. 212,009, filed Dec. 27, 1971, in the names of A. M. Filbert and M. L. Hair and now U.S. Pat. No. 3,782,915.

Another known method for modifying the surface of silica consists of reacting the surface with any of a variety of compounds known as silanes. Silanes are compounds consisting of silicon to which there are attached various organic groups. A silane tends to have a dual functionality in that one part of the compound has an affinity for inorganics while the other part has an affinity for organic compounds. Thus, by reacting a silica material with an appropriate silane compound, it is possible to "tailor make" an organic surface, which surface may be further reacted with other compounds. Examples of well known silanes are the chlorosilanes, ethoxy and methoxysilanes such as α-aminopropyl-triethoxy or trimethoxy silane, hexamethyldisilazane, and the like. Useful applications for such silanes include their use to form a "silane coupling agent" between a high surface area siliceous material and a biologically active substance such as an enzyme (U.S. Pat. No. 33,519,538) or antibody or antigen (U.S. Pat. No. 3,652,761).

Although a number of silanes are commercially available, many are quite expensive, thus limiting their utility for large scale operations. Further, the very availability of certain silanes is quite limited, thus limiting the variety from which a particular silane can be chosen to "tailor make" the surface of a given silica material.

It is also known that the surface of silica materials can be chlorinated in an essentially inert atmosphere with a variety of chlorine compounds. See, for example, M. L. Hair, "Infra Red Spectroscopy in Surface Chemistry", Marcel Dekker, Inc., New York, New York, pages 125–127 (1967). I am unaware, however, of any known procedure for further reacting such chlorinated surfaces with hydroxyl-containing organic compounds to usefully modify silica surfaces.

There has been a growing need for a less expensive method for modifying a silica surface and a method which permits a choice from a wider variety of readily available compounds which can be used in the surface modification. Surprisingly, I have found a relatively simple and inexpensive method for modifying the surface of silica materials so that the surfaces can be deactivated, made hydrophobic, or formed of a given organic compound which can further react with other compounds. The details and preferred embodiments of my method are described below.

SUMMARY OF THE INVENTION

My method of modifying the surface of a silica material having surface silanol

groups comprises the steps of reacting the material at an elevated temperature in an essentially inert atmosphere with carbon tetrachloride vapors for a time sufficient to form surface chloride groups and then reacting the surface modified material with a hydroxyl-containing compound such as an alcohol which can form a stable organic surface. In preferred embodiments the silica material consists of high surface area silica particles which are heated to at least about 375°C. in a sealed furnace which has been evacuated to at least about 70 TORR (one TORR = 1 mm Hg pressure) and then reacted with carbon tetrachloride vapors to form a very reactive chlorinated surface which is then reacted at preferably reduced temperatures with vapors of an hydroxyl-containing organic compound preferably selected from low molecular weight alcohols of the group consisting of methanol, ethanol, propanol, isopropanol, butanol, and n-amyl alcohol.

SPECIFIC EMBODIMENTS

The silica which can be treated according to my method includes any form of silica. However, the advantages of my method are particularly applicable to very high surface area (e.g., greater than 25 m²/g) forms of silica products such as porous glass (which can contain greater than 96% $SiO_2$), colloidal size silica particles, and dried silica gels. The hydroxylcontaining compounds which are ultimately related with the chlorinated silica surfaces are chosen so that a given organic group will ultimately be placed on the silica surface. As used herein, the expression, hydroxyl-containing organic compound, includes relatively low molecular weight alcohols which exist in liquid state at room temperature and which alcohols have hydroxyl groups reactive with the chlorinated surface. For example, if a simple hydrophobic surface is desired (e.g., for certain chromatographic applications), the following compounds could be used: methanol, ethanol, propanol, butanol, or other mono-hydroxylic alcohols of relatively low molecular weight. On the other hand, if the organic surface is to be further reacted with other compounds (e.g., to couple them), the hydroxylcontaining compound must also contain an organic group capable of reacting further or capable of being modified to react further (e.g., ketone, alkene, acid group, etc.).

Surprisingly, I found that $CCl_4$ was the best overall chlorinating agent. Initially, a number of chlorinating compounds were investigated (e.g., $Cl_2$, $CoCl_2$, $ONCl$, $PCl_3$, $BCl_3$, $TiCl_4$, $SnCl_4$, $GeCl_4$, and $CCl_4$). It was found, however, that of all such compounds only the $CCl_4$ reacts with the silica surface at a conveniently rapid reaction rate and/or without the introduction of new metal atoms in the silica surface. Hence, $CCl_4$ is the preferred chlorinating compound.

The chlorination step is carried out in an essentially inert atmosphere at a temperature range of 375° to 425°C. under reduced pressure of 1 to $10^{-6}$ TORR and the subsequent reaction of the low molecular weight alcohol with the chlorinated surface can be carried out at a temperature range of room temperature to about 425°C., above which temperature the alcohol tends to degrade. Since the chlorinated surface is highly reactive, there should be no contact with air or moisture prior to the reaction with the hydroxyl-containing compound. In my examples, the chlorination step and subsequent reaction with the hydroxyl-containing compounds were carried out in a sealed furnace capable of receiving vapors of CCl$_4$ and alcohols under reduced pressure and without the introduction of air or moisture. The actual furnace used is described as follows: A 1 in. i.d. stainless steel tube, of about ¼-inch thickness and 4 inches long was wrapped with a nichrome wire resistance winding. This was then covered with asbestos insulation. A thermocouple was mounted next to the winding near the mid-point of the furnace to both control and monitor the temperature of the furnace. The ends of the furnace tube were enclosed with water cooled brass end plates and equipped with a ¼inch i.d. pipe which was connected to a conventional gas handling system (e.g., a vacuum rack) by means of which the furnace was evacuated and vapors introduced into the furnace containing the material to be treated. For surface study purposes, the brass end plates had infrared transmitting windows, allowing one to spectroscopically follow the course of the various surface reactions. A Perkin Elmer 451 IR Spectrophotometer was used in the examples below.

The principal absorption bands used to monitor the course of the chemical reactions are given in Table 1. The disappearance of a given band showed that the surface compound has been removed, and, knowing the starting material (e.g., the alcohol), the appearance of given bands shows which surface compound has been formed.

TABLE

| Chemical Group | Absorption Frequency in cm$^{-1}$ |
|---|---|
| —Si—OH (silanol) | 3750 |
| HCl (gas) | 2930, 3080 (Band Heads) |
| —CH$_3$ (methyl) | 2990 |
| CH$_3$—CH—CH$_3$ (isopropyl) | 2990, 2950, 2900 |
| —CH$_2$(CH$_2$)$_3$CH$_3$ (n—amyl) | 2970, 2950, 2880 |

Thus, during a typical experiment, the

band at 3750 CM$^{-1}$ is observed initially. After treatment with CCl$_4$, this SiOH band disappeared completely. On treating the chlorinated silica with isopropanol, bands are observed at 2990, 2950, and 2900 CM$^{-1}$, due to the CH$_2$ and CH$_3$ groups of the bonded propoxyl group, as well as gas phase bands centered at 2930 and 3080 CM$^{-1}$ due to the product HCl. The product gaseous HCl is removed, of course, when the system is evacuated. No alcohol-OH bands are observed unless an excess of alcohol is in the cell, and this alcohol is removed by evacuation.

EXAMPLE I

A 0.05 gram portion of silica particles having an average particle size of about 0.01 μm and a surface area of about 200 m$^2$/g (known as Cab-O-Sil M-5 and available from Cabot Corporation) was heated at 800°C. in air for 3 hours to remove all water and/or surface organic contaminents and assure available surface silanol groups. The silica has been pressed into a self supporting disc for ease of handling. The disc was then placed in the cylindrical furnace described above. The furnace was evacuated to 10$^{-2}$ TORR and the contents (the silica disc) were heated to 425°C. and held at that temperature while CCl$_4$ vapors were introduced for 10 minutes at about 70 TORR. At this point, the silica particles had a very reactive chlorinated surface. Any excess CCl$_4$ and/or gaseous reaction products were then removed by evacuating the furnace to about 10$^{-2}$ TORR. The furnace was cooled to about 200°C. and isopropanol was introduced into the furnace at about 25 TORR for three minutes. The furnace was again evacuated to about 10$^{-2}$ TORR and the isopropanol introduction and evacuation procedure was repeated three times to assure complete reaction of the chlorinated surface with the alcohol. IR spectroscopic analysis (absorption frequencies at 2990, 2950, and 2900 cm$^{-1}$) of the treated silica particles indicated reaction of the surface chloride with the alcohol to form surface groups of

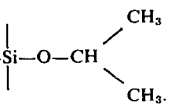

EXAMPLE II

Using essentially the same procedure as in Example I, a 0.05g sample of similar silica particles was surface chlorinated by exposing the silica to CCl$_4$ for 60 minutes at 400°C. The furnace was then evacuated and cooled to about 40°C. and methyl alcohol was introduced into the furnace at 90 TORR for 10 minutes. The evacuation and methanol introduction procedures were repeated two times to assure complete reaction of the chlorinated surface with the alcohol. Infrared spectroscopy (absorption frequency at 2900 cm$^{-1}$) indicated the formation of surface

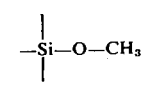

groups.

EXAMPLE III

Using the same procedure as in the above examples, another 0.05g of silica was chlorinated. The furnace temperature was reduced to 100°C., evacuated to about 10$^{-2}$ TORR, and n-amyl alcohol was introduced into the furnace at about 2 TORR for about two minutes. The evacuation and alcohol introduction procedures were repeated six times. IR spectroscopy (absorption frequency at 2970, 2950, and 2880 cm$^{-1}$) indicated the formation of surface

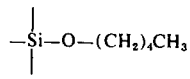

groups.

I claim:

1. A method of modifying the surface of a high surface area silica material having available surface silanol groups which comprises the steps of reacting the material at an elevated temperature in an essentially inert atmosphere with carbon tetrachloride vapors to form surface chloride groups and then reacting the chlorinated surface of the material with vapors of a low molecular weight alcohol, the chlorination step and the subsequent reaction with the alcohol vapors being carried out in a sealed furnace capable of receiving vapors of the carbon tetrachloride and alcohol under reduced pressure and without the introduction of air or moisture.

2. The method of claim 1 wherein the elevated temperature is between about 375°C. and 425°C. at a reduced pressure between about 70 to about $10^{-6}$ TORR.

3. The method of claim 2 wherein the low molecular weight alcohol is selected from the group consisting of methanol, ethanol, propanol, isopropanol, butanol, and n-amyl alcohol.

4. The method of claim 3 wherein the silica material consists of silica particles having a surface area greater than about 25 m²/g.

5. The method of claim 4 wherein the alcohol is isopropanol.

6. The method of claim 4 wherein the alcohol is methanol.

7. The method of claim 4 wherein the alcohol is n-amyl alcohol.

* * * * *